Patented Jan. 16, 1923.

1,442,491

UNITED STATES PATENT OFFICE.

JOSEPH BENSON MARVIN, JR., OF SARANAC LAKE, NEW YORK.

METHOD OF CHLORINATION.

No Drawing. Application filed February 5, 1921. Serial No. 442,754.

*To all whom it may concern:*

Be it known that I, JOSEPH BENSON MARVIN, Jr., a citizen of the United States, and a resident of Saranac Lake, New York, have invented an Improvement in Methods of Chlorination, of which the following is a specification.

My invention relates to chlorination products of anthraquinone, particularly of anthraquinone α sulphonic acid or its salts. It is the object of the present invention to prepare 1:4 dichlor anthraquinone α sulphonic acid, or salts thereof, in an economical and expeditious manner, with economy of time and materials, and with a largely increased yield over what has hitherto been obtainable.

In the accompanying specification I shall, by way of example, describe several illustrative embodiments of the process of my invention, it being however understood that my invention is not limited to the embodiments thereof which are herein described for purposes of illustration only.

Referring to said illustrative embodiments of the present invention, I may state that it has hitherto been proposed, as in German Patent No. 216,071, example 3, to chlorinate anthraquinone α sodium sulphonate to 1:4 dichlor anthraquinone α sodium sulphonate by dissolving the anthraquinone α sodium sulphonate in fuming sulphuric acid of about 20% free $SO_3$ content, and leading into this solution dry chlorine gas. This patent, as an example of what has hitherto been proposed in the prior art, states that the chlorine gas shall be continued to be led into the mixture until a gain in weight of about 35% of the anthraquinone α sodium sulphonate is attained.

I have found, by actual trial and experiment, that under none of the conditions specified in the patent in question can a gain in weight of this size be achieved, and that scarcely 60% of this gain, or less than 21% increase in weight of anthraquinone α sodium sulphonate, can be reached after fifty hours of continuous chlorination. I have, furthermore, observed that after this amount of chlorination has been reached, the chlorination products previously produced are destroyed, if the reaction is continued.

By my process the yield is considerably increased and the time of chlorination considerably decreased, with a consequent gain in efficiency and yield, and a substantial prevention of the destruction of the chlorination products already produced.

For this purpose I take anthraquinone α sodium sulphonate which, in the form in which it is generally prepared, contains a substantial amount of sodium or other chlorides. Accordingly, instead of adding the oleum directly to the anthraquinone α sodium sulphonate containing sodium or other chlorides, with a consequent non-productive consumption of the free $SO_3$, I add ordinary or commercial sulphuric acid of a strength of about 96% to the material in question.

Upon the addition of the sulphuric acid, hydrochloric acid is liberated. The hydrochloric acid thus liberated is driven off by any suitable means, as by passing air through the mixture of anthraquinone α sodium sulphonate and sulphuric acid. There is now added to this mixture an amount of oleum or $SO_3$ to bring the free $SO_3$ content of the mixture up to about 23%.

I have discovered that the desired reaction can be accelerated considerably and the yield very materially increased by passing the chlorine into the mixture, prepared preferably as described above, under pressure. Preferably the pressure employed is from about 5 lbs. per square inch above atmospheric pressure up to any desired pressure, such as 4 or 5 atmospheres, or more, within practical engineering limits, considering the corrosive nature of the gas involved, and this introduction and reaction of chlorine may take place within wide temperature limits.

In place of gaseous chlorine, under pressure, I may use chlorine in liquid form within the receptacle within which the reaction takes place, or I may generate the chlorine within such receptacle, in either of which cases the chlorine forms its own pressure within such receptacle. For example the chlorine may be generated within the receptacle in which the reaction takes place by placing in such receptacle a material or materials which, by their interaction, are capable of producing chlorine. In these ways an even greater pressure may be produced for the reaction between the chlorine and the materials with which the chlorine is to interact.

The importance of providing chlorine in proper amount and pressure within the receptacle in which the reaction takes place will be apparent from the following considerations: By using chlorine gas at about 100 lbs. pressure, which is the usual limit of pressure for gaseous chlorine under ordinary temperatures of about 20° C., comparatively satisfactory yields and results may be obtained. However, by warming the cylinders containing liquid chlorine, as, for example, to a temperature of about 60° C., and keeping the reaction vessel at a temperature of about 10° C. until sufficient liquid chlorine is introduced into the reaction vessel, a pressure of about 200 lbs. may be obtained in the reaction vessel, whereupon it may be heated to about 50° C. for the desired reaction to take place. In this case far more satisfactory results and a better yield, together with a considerable economy in the use of the chlorine, may be effected. This latter result may also be achieved by producing the chlorine in situ from some chlorine-producing substance or substances, as well as by pumping gaseous or liquid chlorine into the reaction vessel.

The economy in the use of chlorine effected by the above modes of procedure is considerable. For example, at a pressure of about four atmospheres and with a reasonable gas space over the sulphuric acid in the reaction vessel, the chlorine used up in the reaction exceeds the theoretical amount of chlorine required by not over 20%. On the other hand, without pressure, as where the reaction vessel is open to the air, the results obtained show a consumption of chlorine of from about 7 to about 30 times the theoretical required amount of chlorine.

By chlorinating as above set forth I avoid to a large extent the formation of either the 9:10 dichlor anthracene sulpho chloride or sulphonic acids, and monochlor $\alpha$, $\alpha$, or $\alpha$, $\delta$, disulphonic acids or their sulpho chlorides, which are ordinarily formed in considerable quantities by the usual methods of chlorination, and which very materially diminish the yield of the desired end product, namely, 1:4 dichlor anthraquinone $\alpha$ sulphonic acid or its salts. Assuming a pressure of chlorination of about 45 lbs. per square inch, and a temperature of about 30° C., the chlorination, according to my method, will reach its maximum in less than about 24 hours, in fact, often in about only 20 hours.

The resulting product comprises a magma of sodium or other acid sulphates and 1:4 dichlor anthraquinone $\alpha$ sulphonic acid in a mixture of oleum and chlorsulphonic acids. The whole is now introduced into a quanity of water sufficient to reduce the strength of the sulphuric acid to about 20%. After bringing the whole to a boil, sodium chloride is added in an amount to make a 20% solution thereof. After cooling, the 1:4 dichlor anthraquinone $\alpha$ sodium sulphonate is filtered off and dried.

This product dissolves readily, on warming, in about 15 parts by weight of a 5% caustic soda solution, with the exception of about 16%, by weight, of the product. This insoluble residue contains none of the desired green-producing principle and consists almost entirely of trichlor anthraquinones. In the warm, the solution of 1:4 dichlor anthraquinone $\alpha$ sodium sulphonate, which is the color-producing principle of the green dyestuff described and claimed in my co-pending patent Serial No. 442,755, filed Feb. 5, 1921, is now filtered off from the insoluble residue, and the filtrate is slightly acidified, as with sulphuric acid, and the 1:4 dichlor anthraquinone $\alpha$ sodium sulphonate is salted out by adding salt until a 20% salt solution is produced. In place of a 5% solution of caustic soda, I may use a solution of equivalent strength of caustic potash or of the carbonates or bi-carbonates of soda or potash.

The precipitated 1:4 dichlor anthraquinone $\alpha$ sodium sulphonate is now pressed, dried and ground, and may be put to any use for which this material is suited, as in the preparation of the green dyestuff set forth in my co-pending application referred to above.

The advantages of the present invention have already been pointed out in some detail above. By means of the present invention the desired reaction is accelerated so that the undesirable by-products, 9:10 dichlor anthracene sulpho chloride or sulphuric acids and monochlor $\alpha$, $\alpha$, or $\alpha$, $\delta$, disulphonic acids or their sulpho chlorides are either not produced at all or are produced in such small amounts as to be unobjectionable and as not to interfere with the reaction or substantially diminish the comparatively great yield rendered possible by my new process.

It is of course to be understood that my invention is not limited to the specific embodiments thereof herein described for purposes of illustration only.

It is of course also to be understood that the expression "sulphonic acid" appearing in certain of the claims includes also the salts of such an acid as well as the acid itself and that the expression "oleum" includes also sulphur trioxide itself.

I claim as my invention:

1. In the process of producing 1:4 dichlor anthraquinone $\alpha$ sulphonic acid, the step which comprises treating an anthraquinone $\alpha$ sulphonate with sulphuric acid of a strength of about 96%, to preliminarily interact with any sodium chloride present in the anthraquinone $\alpha$ sulphonate, and thereafter adding oleum to bring the sulphuric acid up to the desired content of free $SO_3$.

2. In the process of producing 1:4 dichlor anthraquinone α sulphonic acid, the step which comprises treating an anthraquinone α sulphonate with sulphuric acid of a strength of about 96% to preliminarily interact with any sodium chloride present in the anthraquinone α sulphonate, and thereafter adding oleum to bring the sulphuric acid up to the desired content of about 23% free $SO_3$.

3. In the process of producing 1:4 dichlor anthraquinone α sulphonic acid, the step which comprises treating anthraquinone α sulphonic acid with chlorine under pressure in the presence of fuming sulphuric acid.

4. In the process of producing 1:4 dichlor anthraquinone α sulphonic acid, the step which comprises treating anthraquinone α sulphonic acid with chlorine under pressure in the presence of fuming sulphuric acid of about 23% free $SO_3$ content.

5. In the process of producing 1:4 dichlor anthraquinone α sulphonic acid, the step which comprises treating an anthraquinone α sulphonate with sulphuric acid of a strength of about 96% to preliminarily interact with any sodium or other chloride present in the anthraquinone α sulphonate, adding oleum to bring the sulphuric acid up to the desired content of free $SO_3$, and thereafter admitting to the mixture chlorine under pressure.

6. In the process of producing 1:4 dichlor anthraquinone α sulphonic acid, the step which comprises treating an anthraquinone α sulphonate with sulphuric acid of a strength of about 96% to preliminarily interact with any sodium or other chloride present in the anthraquinone α sulphonate, adding oleum to bring the sulphuric acid up to the desired content of about 23% free $SO_3$, and thereafter admitting to the mixture chlorine under pressure.

7. In the process of producing 1:4 dichlor anthraquinone α sulphonic acid, the step which comprises treating anthraquinone α sulphonic acid with chlorine under about four atmospheres' pressure in the presence of fuming sulphuric acid.

8. In the process of producing 1:4 dichlor anthraquinone α sulphonic acid, the step which comprises treating anthraquinone α sulphonic acid with chlorine under about four atmospheres' pressure in the presence of fuming sulphuric acid of about 23% free $SO_3$ content.

9. In the process of producing 1:4 dichlor anthraquinone α sulphonic acid, the step which comprises treating an anthraquinone α sulphonate with sulphuric acid of a strength of about 96% to preliminarily interact with any sodium chloride present in the anthraquinone α sulphonate, adding oleum to bring the sulphuric acid up to the desired content of free $SO_3$, and thereafter admitting to the mixture chlorine under about four atmospheres' pressure.

10. In the process of producing 1:4 dichlor anthraquinone α sulphonic acid, the step which comprises treating an anthraquinone α sulphonate with sulphuric acid of a strength of about 96% to preliminarily interact with any sodium chloride present in the anthraquinone α sulphonate, adding oleum to bring the sulphuric acid up to the desired content of about 23% free $SO_3$, and thereafter admitting to the mixture chlorine under about four atmospheres' pressure.

11. The method which comprises the step of treating a 1:4 dichlor anthraquinone α sulphonate, containing trichlor anthraquinone, with a solution of an alkali to dissolve out the 1:4 dichlor anthraquinone α sulphonate from the trichlor anthraquinone, leaving the latter undissolved.

12. The method which comprises the step of treating a 1:4 dichlor anthraquinone α sodium sulphonate, containing trichlor anthraquinone, with a solution of an alkali to dissolve out the 1:4 dichlor anthraquinone α sodium sulphonate from the trichlor anthraquinone, leaving the latter undissolved.

13. The method which comprises the step of treating a 1:4 dichlor anthraquinone α sulphonate, containing trichlor anthraquinone, with a solution of an alkali to dissolve out the 1:4 dichlor anthraquinone α sulphonate from the trichlor anthraquinone, leaving the latter undissolved.

14. The method which comprises the step of treating a 1:4 dichlor anthraquinone α sodium sulphonate, containing trichlor anthraquinone, with a solution of an alkali to dissolve out the 1:4 dichlor anthraquinone α sodium sulphonate from the trichlor anthraquinone, leaving the latter undissolved.

15. The process of producing 1:4 dichlor anthraquinone α sulphonic acid, which comprises the steps of treating anthraquinone sulphonic acid with chlorine under pressure in the presence of fuming sulphuric acid, diluting the resulting solution of 1:4 dichlor anthraquinone α sulphonic acid, salting out the 1:4 dichlor anthraquinone α sulphonic acid, together with trichlor anthraquinone, and thereafter treating the 1:4 dichlor anthraquinone α sulphonic acid, together with trichlor anthraquinone, with a solution of an alkali to dissolve out the 1:4 dichlor anthraquinone α sulphonic acid from the trichlor anthraquinone, leaving the latter undissolved.

16. The process of producing 1:4 dichlor anthraquinone α sulphonic acid, which comprises the steps of treating anthraquinone sulphonic acid with chlorine under pressure in the presence of fuming sulphuric acid, diluting the resulting solution of 1:4 dichlor anthraquinone α sulphonic acid, salting out the 1:4 dichlor anthraquinone α sulphonic acid, together with trichlor anthraquinone, and thereafter treating the 1:4 dichlor anthraquinone α sulphonic acid, together with trichlor anthraquinone, with a solution of an alkali to dissolve out the 1:4 dichlor anthraquinone α sulphonic acid from the trichlor anthraquinone, leaving the latter undissolved.

In testimony whereof, I have signed my name to this specification this first day of Feb., 1921.

JOSEPH BENSON MARVIN, Jr.